April 16, 1957        C. O. BALL ET AL        2,789,058

FOOD STERILIZATION PROCESSES

Filed July 1, 1953

United States Patent Office 2,789,058
Patented Apr. 16, 1957

2,789,058
FOOD STERILIZATION PROCESSES

Charles Olin Ball, New Brunswick, N. J., and Robert Baker, Theresa, Wis., assignors to The United Products Company, Westminster, Md., a corporation of Maryland Application July 1, 1953, Serial No. 365,406

13 Claims. (Cl. 99—186)

The present invention relates to a novel process for preventing the "burning on" or scorching of canned food products of a thick consistency during heat sterilization.

It is an object of the present invention to provide a process to prevent the adherence or scorching of food material of a thick consistency, such as the finely divided or ground food material in the stratified cream-style food products to be described, to the inner surfaces of the container during heat treatment.

It is a further object of the invention to provide a process to prevent thermal decomposition or scorching of food of a thick consistency which is adjacent to the interior surfaces of a heated container and to prevent the liberation of volatile substances normally resulting from such thermal decomposition.

The above enumerated objects, as well as other objects, together with the advantages of the invention, will be readily comprehended by persons skilled in the art upon reference to the following description, taken in conjunction with the annexed drawings.

Figure 1:
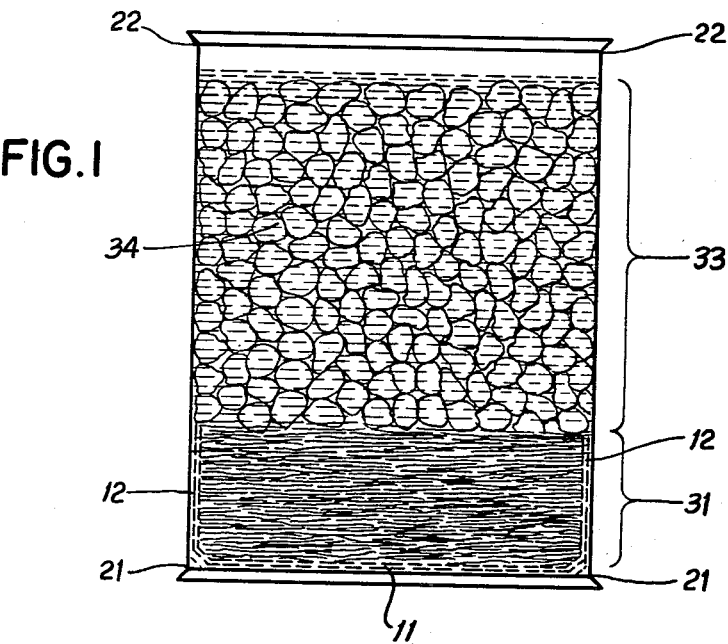
Figure 1 is a longitudinal cross-section of a container filled with a stratified cream-style corn product described in the patent to one of us, namely, Patent No. 2,502,197 to Charles Olin Ball, having one layer of cream phase component, which has been filled in accordance with the process of the present invention.

Heat processing of food products of a thick consistency, and notably ground food, produces a tendency for the surface particles of the food to become attached to the walls of the container due to thermal decomposition of an ingredient or ingredients, probably in combination with the dehydration of the food material. This phenomenon is known in the food processing industry by several designations, including "calcination," "burning on," "scorching" and "browning." This result is particularly prevalent during the heat sterilization of canned foods of a thick consistency. The problem is particularly acute at the 90° angle formed by the ends and sides of the can, as indicated at numerals 21 and 22 in the drawings, on products filled and sterilized in accordance with prior art processes. The "burning on" of food particles to the walls of the container often results in an unsightly discoloration and charring with an accompanying deterioration in flavor, taste, odor and nutritive value. Food technologists have recognized and wrestled with the "burning on" problem for some time without success.

The "burning on" or scorching problem is inherent to foods of a thick consistency and which often have a somewhat lower water content than do more fluid food products. Products which are susceptible to "burning on" are often prepared in a finely divided or ground state, such as, for example, the cream type products, particularly such products as cream-style corn. "Burning on" is extremely prone to occur at the interface between the container walls and the cream phase layers of the stratified cream-style food products described in Patents Nos. 2,502,196 and 2,502,197 of Charles Olin Ball. Corn products are particularly difficult to sterilize because of the frequent contamination of corn with organisms which are highly resistant to heat. Thus comparatively high temperatures must be used to effect sterilization. These high temperatures produce a high incidence of "burning on" in cream-style corn products, particularly the stratified cream-style corn products which will be described below.

The present invention provides a novel process for preventing the undesirable "burning on" or scorching of foods of a thick consistency during heat sterilization. Our process comprises placing a significant and predetermined amount of water in the bottom of the can prior to filling with thick consistency food material component and another layer of a predetermined amount of water is added over the top of the food contents if there is thick consistency food material at the top of the can, making suitable provision for a headspace at the top of the can to allow for expansion. The can is then ready for sealing and subsequent heat sterilization. We have discovered that when at least 0.3 cubic centimeter of water per sq. in. of bottom surface area is added to the empty can before addition of thick consistency food component to the bottom of the can, the food component is substantially free from "burning on" during normal heat sterilization procedures. If the contents at the top of the can after filling are of a thick consistency, at least 0.15 cubic centimeter of water per sq. in. of top container surface should be added before sealing the can. The maximum amount of water which may be added to the bottom of the container before filling, or at the top after filling, is determined by the amount of dilution which the contents will tolerate and yet retain proper consistency and seasoning content. No advantage accrues from the addition of large excesses of water before or after filling, for although there is thereby produced a high degree of protection against "burning on," the resultant undesirable degree of dilution militates against the use of such excesses. The quantities of water specified above for use in the process of the invention greatly exceed the incidental amounts of water which may be retained in the container subsequent to prewashing and/or presteaming treatment.

For preferred results a layer of between 0.45 to 5 cubic centimeters of water per square inch of bottom surface area before filling thick consistency food component into the bottom is recommended. For best results, a water layer of between 0.6 to 2 cubic centimeters per square inch of bottom surface area is recommended. Where water is added to the top of the food prior to sealing the container, the amount of water to be added need only be about 50% of that stated above to be added to the bottom surface prior to filling with the thick consistency food component. Thus for preferred results, the amount of water to be added to the top of the container should be between 0.23 and 2.5 cc. per sq. in. of top surface and for best results 0.3 to 1 cc. per sq. in. of top container surface. The basis for the distinction between the amounts of water to be added to the bottom and top of the container is a result of our research investigation and will be explained below.

While suggestions have been made by the prior art for the solution of the "burning on" problem, so far as we are presently advised, none of these suggestions have met with any appreciable success and the problem plagues the food packing industry to the present day. As a result of our invention, there is made available a process for use by the food canning industry to alleviate this problem. By adding water in the proportions specified above, before filling the empty container with thick consistency food material and also preferably after filling with a thick consistency food material component at the top, there is interposed a layer or film of water between the thick consistency food substance and the inner surface of the container. We have discovered that by adding the water in the prescribed amounts before filling the container with a stratified food product having a stratum of thick consistency food material, such as a stratified cream-style corn product, part of the layer of water is forced upward around the side walls of the can when the thick consistency component is added. If sufficient water, in an amount prescribed above, is added, the layer of water at the bottom 11 (shown in Figures 1 and 2 of the drawings) is forced upward to an extent sufficient to provide an aqueous film or sheathing 12 surrounding the sides of the thick consistency food component layer 31 in the containers. This water, almost instantly at the time of contact, mixes with the surface of the food material to a very shallow depth, which is estimated to be less than 1 millimeter, to dilute greatly this very shallow surface layer and prevent adherence of thick consistency food material to the can. Usually the thick consistency food material is in such a concentrated state as to prevent further penetration into the food material unless the container is subjected to substantial mechanical agitation to cause mixing. This lack of mixing under normal conditions of handling is a result of the characteristic of thick consistency food products, and particularly concentrated ground food products, to resist dilution with water.

Figure 2:
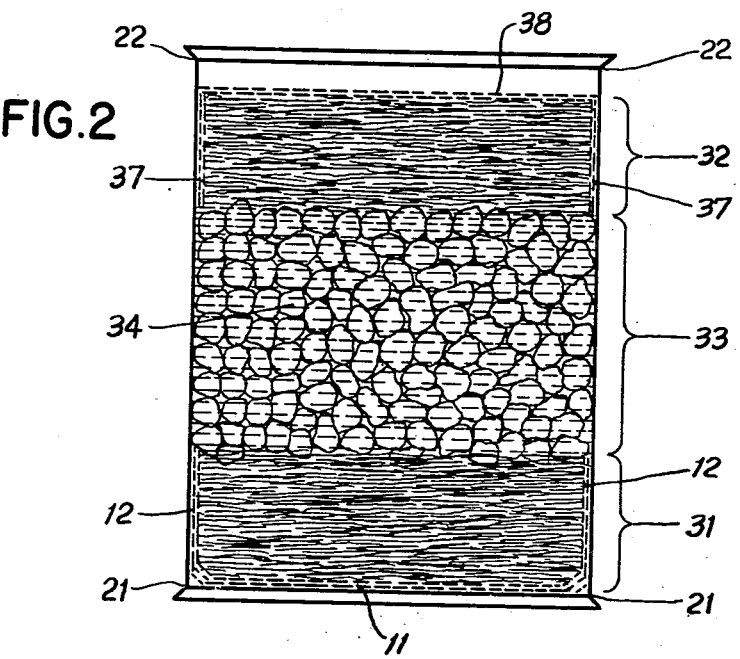
Figure 2 is a longitudinal cross-section of a container filled in accordance with the process of the present invention with a stratified cream-style corn product according to Patent No. 2,502,197, in which the corn product has two layers of viscous cream phase arranged with one layer at each end of the filled can.

The addition of a water layer 38 over a second thick consistency food material layer 32 as shown in Figure 2, in an amount of about 50% of that prescribed for addition to the bottom surface, is made to protect this food surface from "burning on." This layer 38 seeps down the sides of the layer 32 to a certain extent to cooperate with liquid forced up the sides of the container from the more fluid layer shown at 33 to provide the aqueous film or sheathing 37 to protect the sides of layer 32 to aid in protecting this layer from "burning on." Since the water added to the top of the food will diffuse down the sides of the container to a minor extent, and since part of the water is supplied from the thin consistency layer 33, less water is necessary than at the bottom of the container for satisfactory results.

While we do not wish to be limited to any specific theory of the mode of action of the process of our invention, we have made certain observations which appear to explain how our process prevents the "burning on" phenomenon. "Burning on" appears to be caused in part by the contribution of each of several mechanisms. The net result of these mechanisms causes "burning on" or calcination. It is caused in part by localized heating of the thick consistency food material, during which the water in the surface layer is vaporized and driven into the inner portions of the food, where it condenses. In its resulting dehydrated condition, the outer layer of food material falls easy prey to overheating and resulting thermal decomposition. Support for this theory of operation is given by the fact that the layers of water shown at 11, 12, 37 and 38 of the drawings usually disappear upon heat sterilization. The overheating and decomposition is enhanced by the separation of a thin layer of thick consistency food material, resting against the container surface, from the main body of food material. This separation is believed caused by the creation of bubbles of gas or vapor which intervene between the main body and surface layer of thick consistency food material when heat is applied to the container. These bubbles are produced in part by the water vapor driven from the surface portion of the food. Other contributing factors are volatile substances produced by the decomposition, occluded gases contained in the food at the time of sealing and air entrapped in the headspace of the can.

While non-condensible gases appear to be instrumental in forming bubbles among the solid particles when the solids are subjected to severe heat treatment, the mechanism through which the gas acts in promoting "burning on" or calcination is thought to change to a degree after the bubbles are formed. If bubbles are formed by a non-condensible gas in a food product under pressure, as must occur in a closed system, the gas must be compressed. After compressed bubbles are formed, the gas may become rarified through absorption by the inner portions of the food material. This rarified state of the gas will accelerate "burning on" by allowing the greater vaporization of moisture from the dimensionally thin layer of food material which is in contact with the heated container walls. If this accelerated dehydration occurs, "burning on" will be increased.

The process of the present invention is applicable to the sterilization of food products having a thick consistency, such as stratified, thick consistency creamed food products, of which stratified cream-style corn products are an important member. Cream-style corn products being, in general, somewhat thick, viscous products present a serious problem to the canning industry. For not only is corn itself one of the most difficult of food products to sterilize to prevent bacterial spoilage, but because of its viscous nature, the rate of heat transfer from the outer portions of the can or container during heat sterilization is greatly impeded. Because of its propensity for bacterial spoilage, a high degree of heat (about 240 to 250° F.) for times varying from approximately 25 minutes to 180 minutes, depending upon the size of can, proportions existing between quantities of various components and other factors, is required to provide safety from spoilage. If the thick, viscous, cream-style corn product will then transfer heat slowly, that portion of the contents near the walls of the can are prone to be overheated during the long period of sterilization required to heat the innermost confines of the contents of the can. This frequently results in "burning on" of the product. By adding water to the can in an amount exceeding 0.3 cc. per sq. in. of bottom surface area before filling with a thick consistency cream phase layer, and an amount of water in excess of 0.15 cc. per sq. in. after filling with a thick consistency cream phase layer at the top of the can, the sealed and heat sterilized product shows no indication of "burning on" when opened.

The process of the invention is particularly applicable to food products which have been stratified in accordance with the process of Patents Nos. 2,502,196 and 2,502,197, to produce one or more strata of thick consistency food material, in which the thick consistency material has an "apparent viscosity" of at least 0.7 poises when determined by the Brookfield Synchrolectric Viscometer. The term "apparent viscosity" is used to indicate that the measurement is not one of true viscosity, although it is measured in the same manner as if it were true viscosity. The presence of insoluble solids in the stratum or product to be measured may make it impossible to determine the true viscosity. As it relates to the present invention, the apparent viscosity is more pertinent than the true viscosity.

There are disclosed in issued Patents Nos. 2,502,196 and 2,502,197 to one of us, Charles Olin Ball, both issued on March 28, 1950, and assigned to The United Products Company, two processes for heat sterilization of cream-style food products permitting a reduction of sterilizing heat and time. Patent No. 2,502,196 is directed to stratified cream-style food products in general, and Patent No. 2,502,197 is directed to stratified cream-style corn products. Both patented processes are based essentially upon the stratification of the finely ground or cream phase (such as the thick consistency cream phase of corn in layers 31 in Figures 1 and 2 of the drawings) into one and possibly a second layer 32 as shown in Figure 2 at the other end of the can. The remaining phase is an aqueous, thin consistency layer 33 containing discrete solid food particles, such as those of whole kernels of corn 34. It should be understood that the separation of the cream phase or viscous portion into two layers, bottom 31 and top 32 as shown in Figure 2, is optional, although preferred. The advantage of dividing the thick consistency cream phase into two layers is that dimensionally thinner layers of viscous material may be used and there is thus a resulting increase in the rate of heat transfer.

Although issued Patents Nos. 2,502,196 and 2,502,197 are directed broadly to the stratification of the cream phase or thick consistency finely divided material into one or more layers, and the discrete or solid particles with a brine in a separate layer before sterilization, Patent No. 2,502,196 is particularly directed to a process of sterilizing culinary products generally containing from 25 to 80% and preferably from 30 to 65% or 45 to 60% by weight of a coarse, discrete particle component, and the remainder a finely divided component, the bulk of which is capable of passing through an 8-mesh sieve. Patent No. 2,502,197 is particularly directed to a process of sterilizing cream-style corn containing 30 to 65% and preferably 45 to 60% by weight of corn kernels selected from the class consisting of whole corn kernels and parts of whole corn kernels and the remainder a sauce or cream phase containing 8 to 90% (and preferably between 35 and 60%) of finely divided corn grains in added water. The process comprises the heat sterilization of this product in a container (can or jar) while the added water contains not more than 35%, and preferably not more than 25%, of its weight of the finely divided corn grains with the said corn kernels and the remainder of finely divided corn grains substantially stratified in layers. It is desirable that from 50% to 100% of the finely ground material pass through an 8-mesh sieve. The application of the process of the present invention to the processes of these issued patents will be explained in more specific detail below with regard to the cream-style corn product prepared by the process of Patent No. 2,502,197. For purposes of illustration, our novel process will be described in connection with a product in which the cream phase of thick consistency, finely divided material is either divided into two layers at the top and bottom of the can or present as one layer which may be at either the top or bottom of the can.

In applying the novel process of the present invention to the cream-style corn product prepared by the process of Patent No. 2,502,197 having a single stratum of viscous cream phase, we first introduce into the bottom of the container, as shown in Figure 1, a layer of water 11 in an amount exceeding 0.3 cc. per square inch of bottom surface of the container. Next is added the viscous stratum 31 of cream phase or finely divided material. The introduction of this material into the container causes the layer 11 of water in the bottom of the can to be forced up the sides of the container walls so as to supply a film of water 12 between the cream phase layer 31 and the walls of the container. In so forcing the water layer up the sides of the container walls, there is provided a desirably greater thickness of water at the corners of the cans as shown at 21 where maximum protection is needed. There is finally added the thin consistency, aqueous material or brine containing the discrete particles or kernels 34 of corn, as shown at layer 33. Alternately, of course, one may reverse the order of addition of the contents of the container. In such a case it is desirable that the layer of thin consistency, aqueous material containing the whole kernels have a slight excess of liquid covering the kernels which may be forced up the sides of the container to supply the film of liquid 12 when the thick consistency cream phase layer is filled into the can. The last step in this alternative procedure is to add the layer of water at the top of the can which shall exceed 0.15 cc. per square inch of top can surface. It is important, in any procedure, that an air space (or space not filled with liquid or solid material) be provided at the top of the container to allow for expansion during subsequent heat sterilization.

In applying the novel process of the invention to the cream-style corn product prepared by the process of issued Patent No. 2,502,197 of one of us, Charles Olin Ball, wherein there are two layers of the cream phase as shown in Figure 2, we first introduce into the bottom of the clean can or container a layer of water 11 in an amount exceeding 0.3 cc. per square inch of bottom surface of the can. Next is introduced a portion of the cream phase or finely divided material into the container. The introduction of this material causes the layer of water 11 in the bottom of the can to be forced in part up the sides of the container walls so as to supply a film of water 12 between the cream phase and the walls of the container. As described above, this produces an enlarged thickness of water at 21 which is quite important if optimum results are to be obtained. There is next added the thin consistency, aqueous material containing the discrete particles or kernels 34 of corn, as shown at layer 33. This layer will advantageously have an excess of water or brine so as to slightly more than cover all of the discrete particles when these particles are pressed down by the weight of the solid material on top of them. The remainder of the cream phase is next introduced over this fluid aqueous phase, forcing part of the excess liquid up the sides of the container walls between the cream phase material and the container walls, as shown at 37. Lastly, there is added at the very top of the can a further layer of water 38 to exceed 0.15 cc. per square inch of top can surface.

The filled can is finally sealed and sterilized by subjecting the can to heat. Upon opening the can, a close examination of the contents when produced by the process of the present invention, and particularly the layers of cream phase component adjacent the walls of the can, shows little or no discoloration or darkening. The food material is of an elegant white or gold, natural color. The flavor of the sterilized product is of an excellent quality, manifesting little or no food decomposition due to heat. In the processes of the prior art, the surface layer of cream phase material adjacent to the walls of the can, and particularly at the corners of the can 21 and 22, is prone to show an unsightly discoloration and "burning on" of food particles to the walls of the container, indicative of thermal decomposition. The flavor qualities of a product made by the prior art processes demonstrate that burning of the food has taken place.

In the two figures of the drawings, the dimensional thickness of the water layers, introduced in accordance with the process of the present invention, has been exaggerated for purposes of illustration. When the quantities of water specified are used, the water layers would not be visible in the scale used for the present drawings.

In order to disclose more clearly the nature of the present invention, specific examples illustrating the process of the invention will hereinafter be described. This is done solely by way of example and is intended neither to delineate the scope of the invention nor limit the ambit of the appended claims.

*Example 1*

The following example shows the application of the process of the present invention to a stratified cream-style corn product prepared in accordance with the process of Patent No. 2,502,197. A product in No. 10 cans was prepared containing approximately 34% of whole kernels and a sauce which was composed of approximately 52% of finely divided corn, 9.4% of added sugar, 1.6% of added salt, 1.8% of added starch, and 35.2% of added water including the steam condensed in the cream component. Of this product, the finely divided or cream component, as filled into the containers after heating with steam, was made up of 63.8% of water, and which in accordance with the process described in the copending patent application of one of us, Charles Olin Ball, contained therein the natural soluble solids and added sugar in proportions of 5.5% and 14.2%, respectively, by weight, of the final liquid phase of the cream component. This component also contained 18% insoluble solids from the ground-up corn and 2.5% of added starch. A typical procedure for filling, closing and processing the preparation in the cans according to the present invention was as follows: Into each can was first placed 0.6 cc. of water per square inch of surface area of the bottom of the can. This was then followed by 25 ounces of heated cream component constituted as described above, then 37 ounces of heated whole kernels, followed by 18 ounces of brine containing 1.1 ounces of salt. To this was then added 28 ounces more of heated cream corn component. In the headspace remaining there was then added about .3 cc. of water per square inch of surface area of the top of the can. This preparation is described in Figure 2 of the drawings. As soon as filled, the cans were sealed under a vacuum equivalent to 20 inches of mercury. When the ingredients were filled at a temperature of 170° F., the cans were sterilized in a treatment of 115 minutes at 242° F. Examination of the sterilized product showed no indication of discoloration or "burning on." Similarly, the flavor of the product was excellent, giving no indication of any thermal decomposition products. When prepared in accordance with the prior art processes, the surface layer of the cream phase material, particularly at the bottom and top of the can, and especially at the corners of the can, would show unsightly discoloration and "burning on" of material to the walls of the container.

*Example 2*

A cream corn product in No. 10 cans was prepared containing approximately 43 percent of whole kernels and a sauce which was composed of approximately 43% of finely divided corn, 9.6% of added sugar, 1.7% of added salt, 1.7% of added starch, and 44% of added water, including steam condensate in the cream component. Of this product, the finely divided, or cream component, as described in the pending application of one of us, Charles Olin Ball, and as filled into the containers after heating with steam, was made up of 58.4% of water, which contains natural soluble solids, added sugar and added salt in proportions of 6%, 18.1% and 3.3%, respectively, by weight of the final liquid phase in the cream component. This component also contained 17% of insoluble solids from the ground-up corn and 2.5% of added starch. A typical procedure of filling, closing and processing the preparation in the cans in accordance with the present invention was as follows: Into each can was first placed 1.0 cc. of water per square inch of bottom surface area of the can, followed by 41 ounces of heated cream component constituted as described above. Then 46.5 ounces of heated whole kernels and 21 ounces of water at practically boiling temperature were added. After the cans were filled, they were sealed and placed top end up, into a steam retort. The product prepared is illustrated by Figure 1 of the drawings. When the average temperature of the ingredients upon filling was 170° F., the cans were sterilized for 100 minutes at 240° F. After sterilization, the cans were cooled in water. The sterilized product was excellent in taste, flavor, odor and appearance. Examination of the contents of the sterilized product revealed little or no discoloration or "burning on." In a product prepared by a similar process but not using the process of the present invention, large areas of the outer surfaces of the cream phase showed unsightly discoloration and "burning on" of the product.

In accordance with the teachings of the present invention, it is contemplated that in the above example the order of addition of the components into the can may be reversed. In such a case the protective layer of water will be added to the top of the can over the top of the thick consistency layer. More specifically, the heated whole kernels and the 21 ounces of water are added first. This quantity of water, when introduced with 46.5 ounces of whole kernels will supply sufficient liquid to be partially forced up the sides of the can when the cream component is added and thus form a protective layer of water between the sides of the can and the cream layer. The last and important step before sealing the can is to introduce over the cream component the layer of 0.15 cc. or more of water per square inch of top surface of the can.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. In the process of packing and heat sterilizing canned food products of a thick consistency, the novel step for the prevention of "burning on" of the food product onto the can surface, which comprises, introducing between the corners formed by the ends and sides of the can and the adacent surface of the thick consistency food product, a thin layer of water.

2. In the process of packing and heat sterilizing canned food products of a thick consistency, the novel step for the prevention of "burning on" of the food product onto the can surface, which comprises, introducing between at least one end of the can, the corners formed by the ends and sides of the can and the adjacent surface of the thick consistency food product, a thin layer of water.

3. In the process of packing and heat sterilizing canned food products of a thick consistency, the novel steps for the prevention of "burning on" of the food product onto the can surface, which comprise, introducing first into the bottom of the can, a layer of water in an amount in excess of 0.3 cc. per square inch of the surface area of the bottom of the can, next adding the food product and finally adding a layer of water in excess of 0.15 cc. per square inch of the surface area of the top of the can, and finally sealing the can.

4. In the process of packing and heat sterilizing canned food products of a thick consistency, the novel steps for the prevention of "burning on" of the food product onto the can surface, which comprise, introducing first into the bottom of the can, a layer of water in an amount of between 0.45 and 5.0 cc. per square inch of the surface area of the bottom of the can, next adding the food product and finally adding a layer of water of between 0.26 and 2.5 cc. per square inch of the surface area of the top of the can, and finally sealing the can.

5. In the process of packing and heat sterilizing a stratified canned food product, a stratum of which, at least during heat sterilization, is of a thick consistency, the novel step for the prevention of "burning on" of the food product onto the can surface, which comprises, introducing between the outer surface of the stratum of the cream phase of the food product and the adjacent can walls, a layer of water in an amount in excess of 0.15 cc. per square inch of the surface area of one end of the can.

6. In the process of packing and heat sterilizing a stratified cream-style canned corn product, a stratum of which, at least during heat sterilization, is of a thick consistency, the novel step for the prevention of "burning on"

of the cream phase of the corn product onto the can surface, which comprises, introducing between the outer surface of the stratum of the cream phase of the corn product and the adjacent can walls, a layer of water in an amount in excess of 0.15 cc. per square inch of the surface area of one end of the can.

7. In the process of packing and heat sterilizing a stratified canned food product, a stratum of which, at least during heat sterilization, is of a thick consistency, the novel steps for the prevention of "burning on" of the food product onto the can surface, which comprise, introducing first into the bottom of the can a layer of water in an amount in excess of 0.3 cc. per square inch of the surface area of one end of the can, next adding a stratum of food component having a thick consistency, followed by a stratum of aqueous component having a thin consistency, and subsequently sealing the can.

8. In the process of packing and heat sterilizing a stratified canned food product, a stratum of which, at least during heat sterilization, is of a thick consistency, the novel steps for the prevention of "burning on" of the food product onto the can surface, which comprise, introducing first into the bottom of the can a layer of water in an amount of between 0.45 and 5.0 cc. per square inch of the surface area of one end of the can, next adding a stratum of food component having a thick consistency, followed by a stratum of aqueous component having a thin consistency, and subsequently sealing the can.

9. In the process of packing and heat sterilizing a stratified canned food product, a stratum of which, at least during heat sterilization, is of a thick consistency, the novel steps for the prevention of "burning on" of the food product onto the can surface, which comprise, completing the filling of the contents of the can by adding a stratum of food component having a thick consistency at the top of the can, followed by adding a layer of water in an amount in excess of 0.15 cc. per square inch of the surface of one end of the can before sealing the can.

10. In the process of packing and heat sterilizing a stratified cream-style canned corn product, a stratum of which, at least during heat sterilization, is of a thick consistency, the novel steps for the prevention of "burning on" of the cream phase of the corn product onto the can surface, which comprise, introducing first into the bottom of the can a layer of water in an amount in excess of 0.3 cc. per square inch of the surface area of one end of the can, next adding a stratum of the cream phase of the corn product having a thick consistency, followed by an aqueous phase of thin consistency containing the discrete corn particles, and subsequently sealing the can.

11. In the process of packing and heat sterilizing a stratified canned food product, a stratum of which, at least during heat sterilization, is of a thick consistency, the novel steps for the prevention of "burning on" of the food product onto the can surface, which comprise, introducing first into the bottom of the can a layer of water in an amount in excess of 0.3 cc. per square inch of the surface area of one end of the can, next adding an initial stratum of food component having a thick consistency followed by a stratum of aqueous component having a thin consistency, then adding a second stratum of food component having a thick consistency, next covering the top of the substantially filled can with a layer of water in an amount in excess of 0.15 cc. per square inch of the surface area of the top end of the can, and subsequently sealing the can.

12. A process as defined by claim 2, wherein the canned food product of a thick consistency contains 30 to 65% of discrete food particles and the remainder a sauce containing 8 to 90% of a finely divided food product in added liquid.

13. A process as defined by claim 2, wherein the canned food product is cream-style canned corn containing 30 to 65% of corn kernels selected from the class consisting of whole corn kernels and parts of whole corn kernels and the remainder a sauce containing 8 to 90% of finely divided corn grains in added water.

References Cited in the file of this patent

UNITED STATES PATENTS

| Number | Name | Date |
|---|---|---|
| 909,600 | Huch | Jan. 12, 1909 |
| 1,729,893 | Oliver | Oct. 1, 1929 |
| 1,962,287 | Stevenson | June 12, 1934 |
| 2,127,782 | McShane | Aug. 23, 1938 |
| 2,369,765 | Waters | Feb. 20, 1945 |
| 2,502,196 | Ball | Mar. 28, 1950 |
| 2,502,197 | Ball | Mar. 28, 1950 |
| 2,538,115 | Maurer | Jan. 16, 1951 |